United States Patent
Bushee

(10) Patent No.: US 9,508,391 B2
(45) Date of Patent: Nov. 29, 2016

(54) MULTIFUNCTION FLASHLIGHT

(71) Applicant: Glenn Bushee, Duxbury, MA (US)

(72) Inventor: Glenn Bushee, Duxbury, MA (US)

(*) Notice: Subject to any disclaimer, the term of this patent is extended or adjusted under 35 U.S.C. 154(b) by 0 days.

(21) Appl. No.: 14/788,833

(22) Filed: Jul. 1, 2015

(65) Prior Publication Data

US 2015/0318023 A1    Nov. 5, 2015

Related U.S. Application Data

(63) Continuation of application No. 13/262,804, filed as application No. PCT/US2010/055038 on Nov. 2, 2010.

(60) Provisional application No. 61/338,297, filed on Feb. 17, 2010, provisional application No. 61/281,038, filed on Nov. 12, 2009.

(51) Int. Cl.
   *G11B 33/06* (2006.01)
   *G11B 33/02* (2006.01)
   *G11B 33/10* (2006.01)
   *F21L 4/00* (2006.01)
   *F21V 33/00* (2006.01)

(52) U.S. Cl.
   CPC ............... *G11B 33/06* (2013.01); *F21L 4/005* (2013.01); *F21V 33/0052* (2013.01); *F21V 33/0056* (2013.01); *G11B 33/025* (2013.01); *G11B 33/10* (2013.01)

(58) Field of Classification Search
   None
   See application file for complete search history.

(56) References Cited

U.S. PATENT DOCUMENTS

| | | | | |
|---|---|---|---|---|
| 6,043,747 A * | 3/2000 | Altenhofen | ........ | G08B 21/0208 340/539.1 |
| 2002/0186135 A1* | 12/2002 | Wagner | .............. | G08B 21/0202 340/573.1 |
| 2003/0002274 A1* | 1/2003 | Thrower | ............. | F21V 33/0052 362/86 |
| 2004/0053695 A1* | 3/2004 | Mattice | ............... | G07F 17/3262 463/42 |
| 2004/0203996 A1* | 10/2004 | Hansson | ................. | H04M 1/03 455/550.1 |
| 2005/0226450 A1* | 10/2005 | Akino | .................... | H04R 1/083 381/361 |
| 2005/0236265 A1* | 10/2005 | Kobayashi | ......... | H01H 13/7006 200/511 |
| 2005/0248719 A1* | 11/2005 | Howell | .................. | G02C 11/10 351/41 |
| 2006/0028811 A1* | 2/2006 | Ross, Jr. | ............. | F21V 33/0052 362/157 |
| 2006/0290803 A1* | 12/2006 | Kimoto | .................. | H04N 5/232 348/345 |
| 2007/0019426 A1* | 1/2007 | Uken | ........................ | B60R 1/12 362/494 |
| 2008/0219482 A1* | 9/2008 | Sato | ........................ | H04R 19/04 381/174 |
| 2008/0316121 A1* | 12/2008 | Hobson | ................. | H01Q 1/243 343/702 |

* cited by examiner

*Primary Examiner* — Christopher S Kelley
*Assistant Examiner* — Kaitlin A Retallick
(74) *Attorney, Agent, or Firm* — Lawrence J. Shurupoff

(57) ABSTRACT

A multifunction flashlight includes an audio recorder, a video recorder and a flashlight having one or more operating modes. The flashlight includes an audio microphone secured within a water-tight interior compartment in the body of the flashlight. A storage compartment is provided in a rear portion of the flashlight for removably storing one or more light diffuser caps which are selectively mountable over the flashlight lens. A port in the wall of the flashlight can be opened to improve audio reception and sensitivity of a microphone housed within the flashlight. A resilient switch cover is provided with two or more differently textured surface portions to allow an operator to identify an audio, video or lighting function by tactile feel or touch. A delay circuit can be provided to protect the audio and/or video functions from in advertent or unintentional actuation.

18 Claims, 9 Drawing Sheets

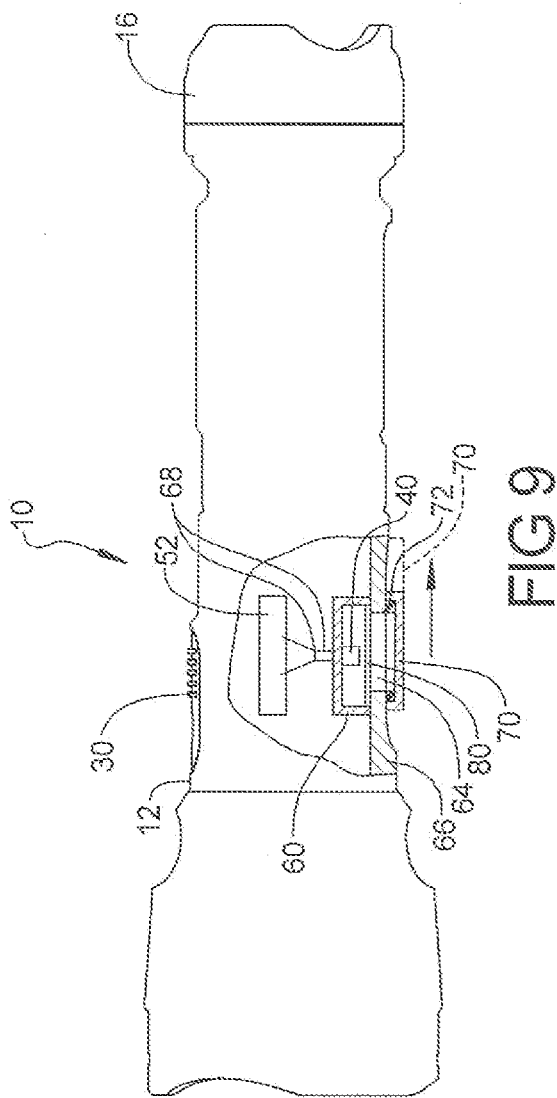
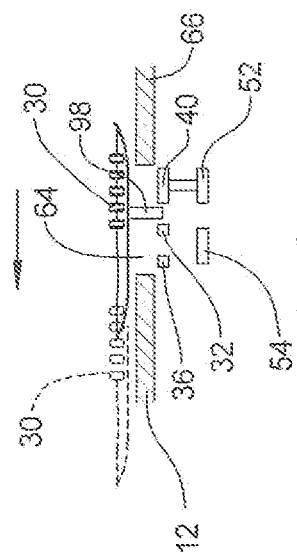
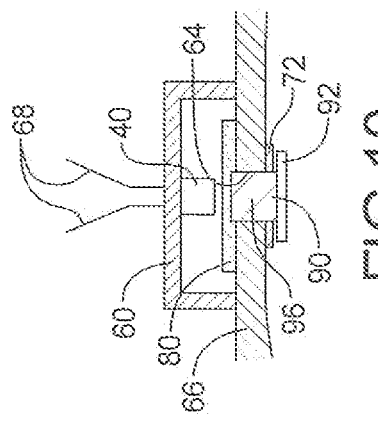

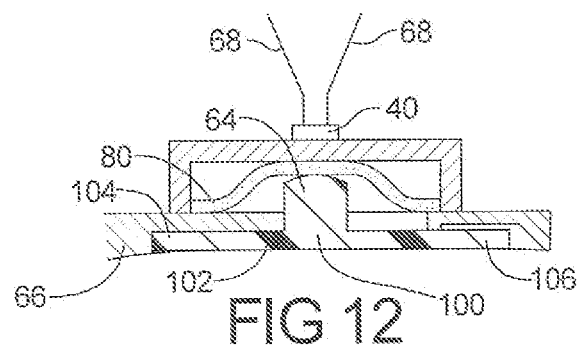
FIG 12
FIG 13
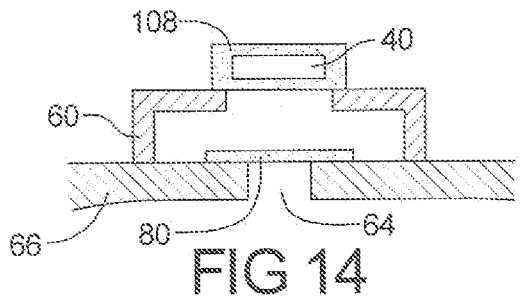
FIG 14
FIG 15

MULTIFUNCTION FLASHLIGHT

CROSS REFERENCE TO RELATED APPLICATION

This application is a continuation of application Ser. No. 13/262,804 filed on Oct. 3, 2011 which claimed the benefit and priority of PCT application number PCT/US10/55038 filed on Nov. 2, 2010 which claimed the benefit and priority of U.S. provisional application No. 61/338,297 filed on Feb. 17, 2010 and U.S. provisional application No. 61/281,038 filed on Nov. 12, 2009.

BACKGROUND and SUMMARY

Law enforcement officers typically carry a flashlight while on duty. Such flashlights are often referred to as "duty lights". While these conventional flashlights work well, it may be desirable in some cases to combine multiple functions with the traditional lighting and illumination functions provided by conventional duty lights.

In accordance with this disclosure, a digital photographic recording or video function and an audio or sound recording function can be combined with a traditional duty light function in a compact durable flashlight body.

Photographic recordings of high quality can be obtained with the use of a light diffusing lens cap which can be selectively mounted over the lens of the flashlight. The diffuser lens can be conveniently stored in a compartment formed in part by a removable end cap on the body of the flashlight.

In order to protect the audio recording microphone from shocks, loud noises and water damage, the microphone is conveniently mounted beneath a flexible elastomeric watertight light switch cover used for operating the lighting function and the audio and video recording function of the flashlight. While it may seem that such a recessed and covered mounting would adversely affect the quality of audio recordings, this has been found not to be the case. In fact, excellent quality audio recordings are possible with the microphone mounted beneath the light switch cover and beneath the switches which are actuated by depressing the switch cover.

To further protect the audio recording microphone from damage due to loud noises, such as gunfire and explosions, the microphone can be covered, encased or encapsulated in a protective sound attenuating covering, such as a foam material, flocked material, sponge-like material, a batting material, or preferably an open-cell foam material.

A polarized lens cap is provided to reduce glare from reflected sunlight. For example, when video recording a shiny object n sunlight, such as a laminated driver's license or a car window, a polarized lens fitted over the lens of the video recorder will improve the quality of the recorded images by reducing the glare reflected from the license or window. Similar improvements are achieved at night by reducing the glare from bright lights, such as high intensity flashlights and car headlights.

In one embodiment, an on-off switch which operates the video recorder is connected to a timer circuit which provides a timed delay between the time the switch is activated and the time the video recorder responds. That is, once an operator depresses or activates the on-off switch for the video recorder, the switch must remain depressed for a predetermined period of time, such as one-half, one or two seconds, before the video recorder is turned on and turned off. This prevents accidental or unintentional activation and deactivation of the video recorder by a momentary brief depression of the video recorder on-off switch such as may occur when the flashlight is dropped or bumped.

Once the video recorder is activated and begins recording, a blinking light can shine through, a translucent switch cover to provide notice to an operator that the flashlight is recording video images. When the video recorder is turned off, the blinking light is also turned off.

The switch cover can include two different surface portions to provide two different tactile sensations to an operators fingers and thumb. For example, a smooth, resilient surface portion, can overlie the video recorder on-off switch, and a textured, resilient surface portion can overlie the flashlight on-off switch. The feel of the different sections provides an indication to the operator that the operator is activating the desired function—i.e. illumination or video recording or, optionally audio recording. Optionally, a third differently textured portion can be provided on the portion of the switch cover overlying the audio switch. Pressing down on the desired switch surface portion activates and deactivates the video recorder and the flashlight and/or optionally, the audio recorder.

BRIEF DESCRIPTION of the DRAWINGS

In the drawings:

FIG. 9 is right side view, partially in section, showing an alternate embodiment;

FIGS. 10-13 are partial views of other embodiments similar to FIG. 9;

FIG. 14 is a partial view of a microphone enclosed in a shock absorbing material; and FIG. 15 is a schematic view of a switching arrangement including a time delay circuit.

In the various views of the drawings, like reference numerals denote like or similar parts.

DETAILED DESCRIPTION of REPRESENTATIVE EMBODIMENTS

Figure 1:
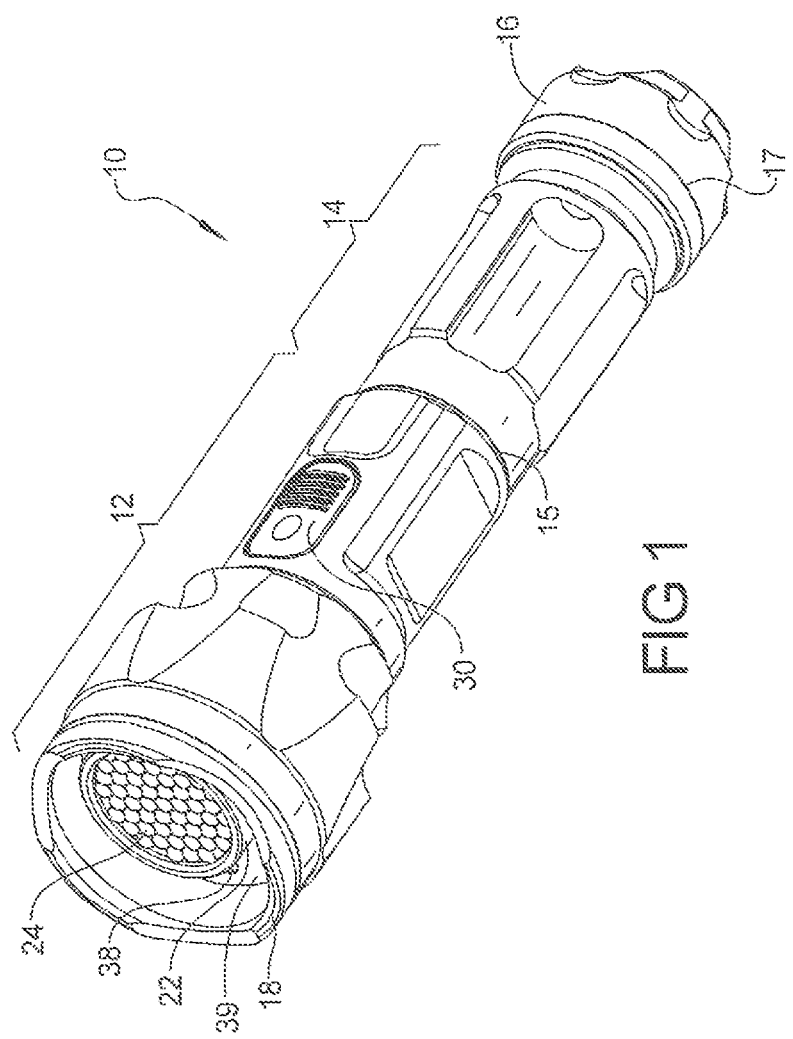
FIG. 1 is a top perspective view of the multifunction duty light constructed in accordance with this disclosure.
Figure 2:
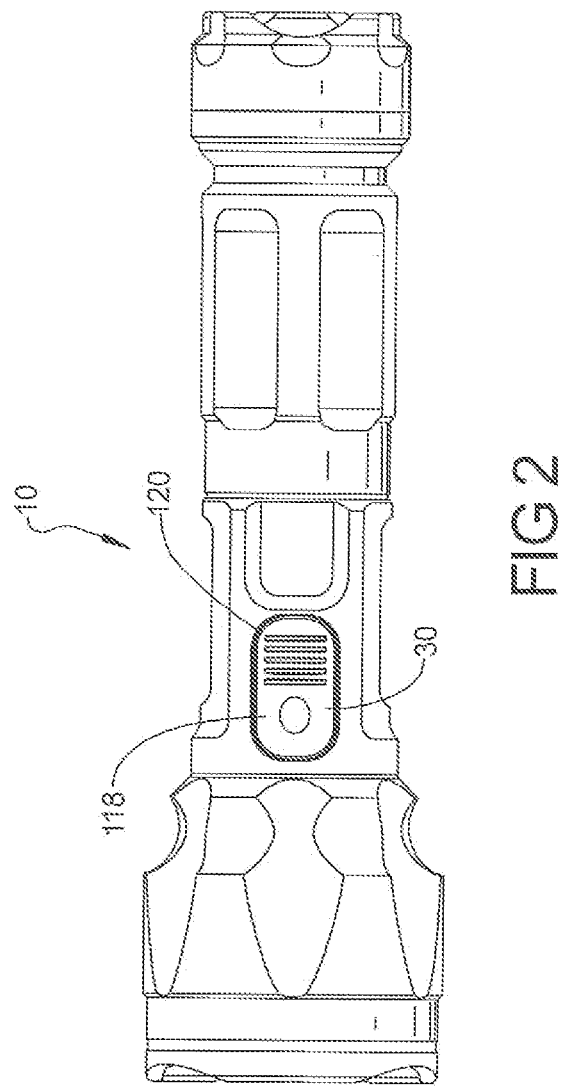
FIG. 2 is a top plan view thereof.
Figure 3:
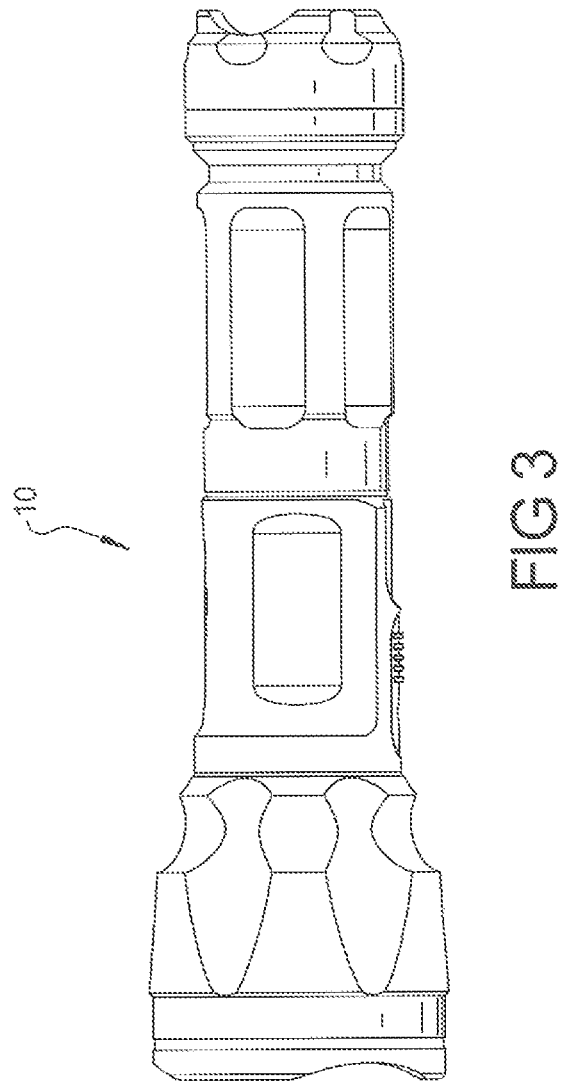
FIG. 3 is a left side elevation view thereof.
Figure 4:
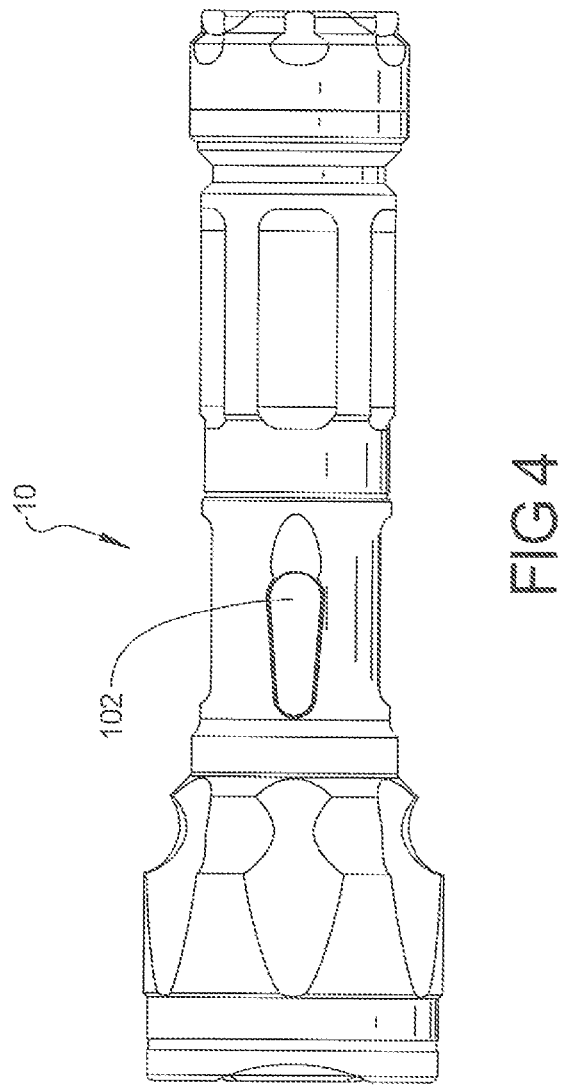
FIG. 4 is a bottom plan view thereof.

As seen on FIGS. 1-8, a multifunction flashlight 10 is constructed in three sections, namely a front tubular body portion 12, a rear tubular body portion 14 and a rear end cap 16. The front and rear body portions 12, 14 and the rear end cap 16 can be fabricated from any durable material such as metal or plastic materials, with aluminum alloys being well suited for this application.

The front and rear body portions 12, 14 can be removably interconnected at interface 15 with a screw-thread connection, and the end cap 16 can be removably interconnected at interface 17 to the rear body portion 14 with a screw-thread connection. A cylindrical front crown 18 surrounds a circular rim or bezel 22 which surrounds a lens through which light from the multifunction flashlight is projected.

A circular light diffuser cap 24 is removably mounted on the bezel 22 with a simple friction fit. The diffuser cap 24 is formed with a smooth inner surface and a textured or rounded granular outer surface to diffuse the light emitted from the multifunction flashlight 10. The diffuser cap 24 can be formed of clear or colored transparent plastic.

A red diffuser cap can be used for night flying illumination by pilots, a blue diffuser cap can be used by investigators to locate blood stains and a green diffuser cap can be used for reading topographical maps in the dark. A clear diffuser cap can be used for eliminating any high intensity or "hot spots" of light so that the light beam emitted though the clear diffuser cap has a substantially uniform intensity without dark spots and/or bright spots. In addition to or in place of the diffuser cap 24, a light polarizing cap 25 (FIG. 8) can be press fit over the front crown 18 to reduce glare when recording video images.

As further seen in the Figures, a resilient thin-walled elastomeric or rubber switch cover 30 is mounted on the front body portion 12. As shown schematically in FIG. 5, two on-off button switches 32, 34 are mounted within the hollow front body portion 12 directly beneath the switch cover 30. In this embodiment, the front switch 32 turns both the audio recorder 52 and a video recorder 54 on and off simultaneously.

Figure 5:
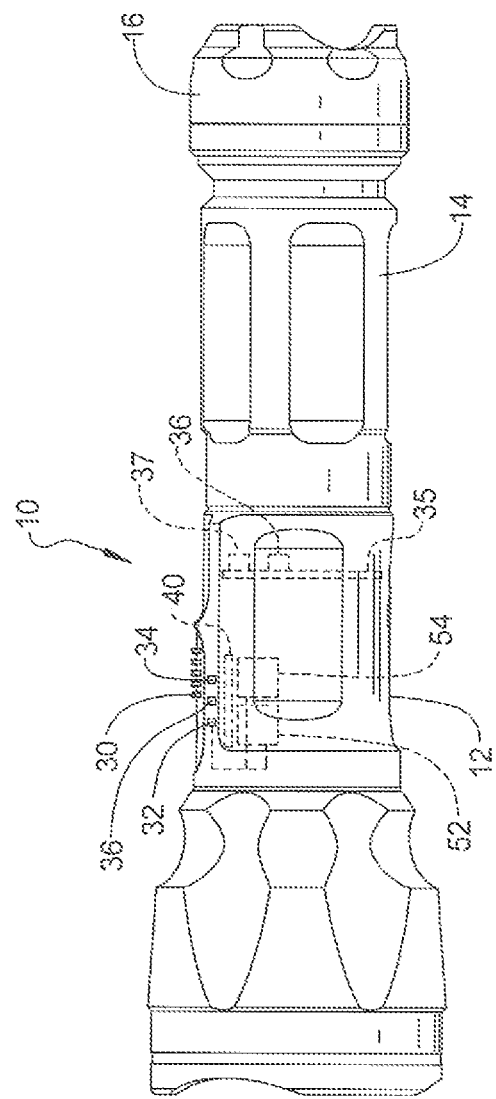
FIG. 5 is a right side elevation view thereof.
Figure 6:
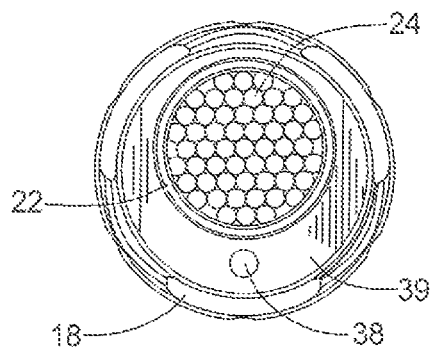
FIG. 6 is a front elevation view thereof.
Figure 7:
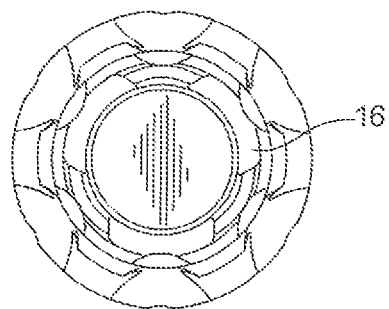
FIG. 7 is a rear elevation view thereof.

As discussed below, switch 32 can be adapted to only actuate the video recorder 54. The digital audio and video recorders 52, 54 are of known design and are mounted within the front body portion 12 as schematically shown in FIG. 5. The rear switch 34 simply turns the flashlight on and off. However, switch 34 can be connected to a logic chip or switching circuit 55 (FIG. 15) within the front body portion 12 to select a high intensity light mode, a low intensity light mode, a high intensity strobed light mode and an off mode. Selection of any particular operating mode can be achieved by repetitively and serially depressing and releasing the switch cover 30 and button switch 34 until a desired operating mode is reached by sequentially pulsing or switching the button switch 34 up and down.

In some applications it may be desirable to record only video or only audio. In those cases, a third button switch 36 (FIG. 5) can be connected to the audio recorder 52 for independently turning it on and off, and the front switch 32 can be connected to the video recorder 54 for independently turning it on and off. A small video lens 38 (FIGS. 1 and 6) is shown mounted behind a front mounting plate 39 in a known fashion.

In another embodiment, the audio switch 36 (FIGS. 5 and 15) is mourned remotely from the switch cover 30 on an internal wall 35 in the front body portion 12. Wall 35 supports one or more electrical, connectors 37 for downloading audio and video recordings from the recorders 52, 54 to a computer hard drive, disk, flash drive or other electronic storage device. The switch 36 and connectors 37 are made accessible by unscrewing the front body portion 12 from the rear body portion 14. Another switching arrangement is shown in FIG. 15 and discussed further below.

As further seen in FIG. 5, an audio microphone 40 is mounted within the front body portion 12 directly below the switch cover 30 and directly below the switches 32, 34. In this arrangement, the microphone 40 is safely sealed and protected within the water-tight interior of the front body portion 12, as opposed to being exposed to the elements by being mounted on the exterior of the multifunction flashlight 10. The switch cover 30 is mounted to the front body portion 12 with a water-tight fit to prevent water from entering the interior of the front body portion and damaging the microphone, the audio and video recorders 52, 54 and the electronic circuits housed therein.

Because the elastomeric material of switch cover 30 is thin (about 1 mm or less), sound easily passes through the switch cover 30 with very little sound absorption and decibel loss. Surprisingly, the microphone 40 is able to record crisp and clear audio input while being mounted in a closed water-tight enclosure within the front body portion 12.

Figure 8:
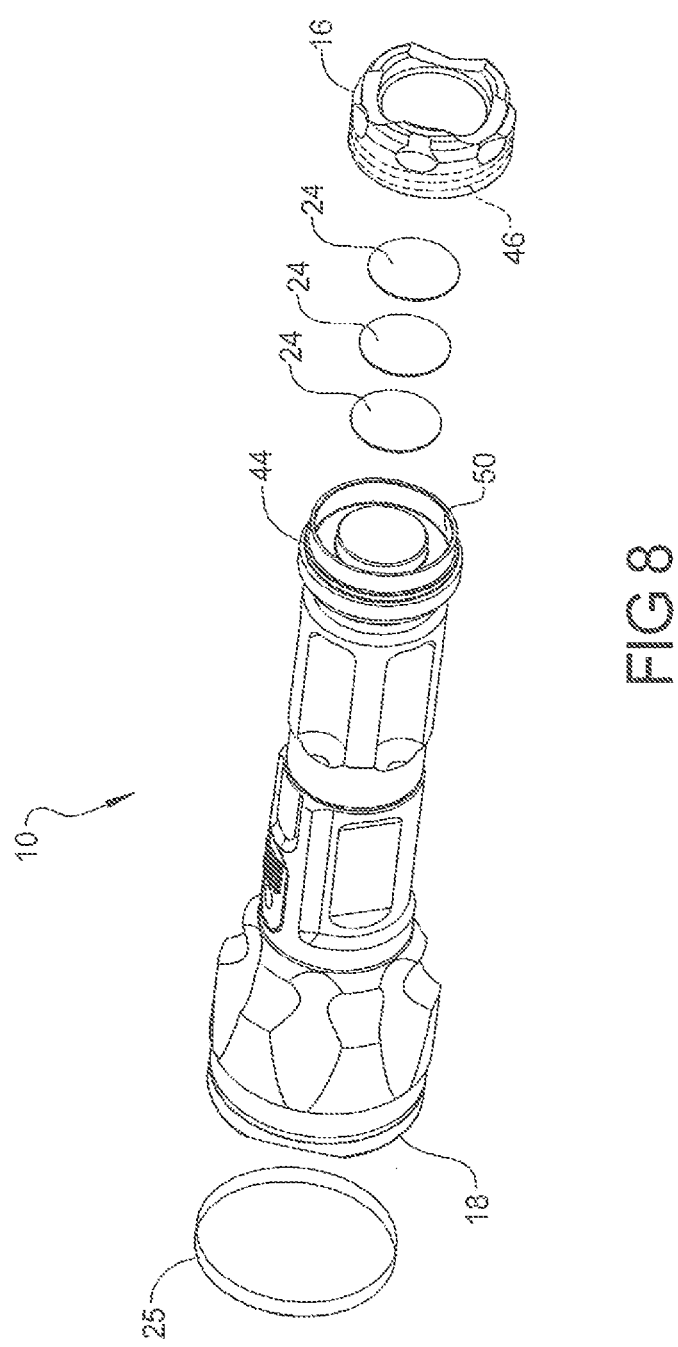
FIG. 8 is a partially exploded rear perspective view thereof.

As seen in FIG. 8 the end cap 16 and the rear body portion 14 are formed with matching screw threads 44, 46. A storage compartment 50 is formed as a recessed cylindrical pocket in the open rear end of the rear body portion 14 to receive and store one or more of the diffuser caps 24 and/or small light polarizing lenses of the type noted above. This provides a handy storage container for the diffuser caps 24 and optionally for the polarizing lenses 25 and reduces the risk of loss of the diffuser caps and polarizing lenses.

Another embodiment is shown in FIG. 9 wherein the audio microphone 40 is mounted on a support or bracket 60 mounted within the flashlight 10. The microphone 40 is positioned near or directly over a slot, port or opening 64 formed through the external or exterior wall 66 of the front body portion 12. The microphone 40 and port or opening 64 can alternatively be positioned on the rear body portion 14. Wires 68 connect the microphone 40 to the audio recorder 52.

A sliding or pivoting cover 70 is mounted over the port or opening 64 to protect the microphone from the environment when the audio recorder 52 is not in use. To achieve highly accurate audio recordings, a user can simply push or slide the cover 70 away from the opening 74 so as to directly expose the opening 64 and microphone 40 to the ambient environment and allow for improved audio communication and sensitivity between the microphone 40 and the surrounding ambient.

As seen in FIG. 9, the cover 70 can slide rearwardly within a slideway from the forward position as shown in solid lines, where the cover closes the opening 64, to the rear position shown in dashed lines, allowing the microphone 40 to communicate more freely with the surrounding ambient. Alternatively, the cover can simply pivot about a pivot pin to expose and close the opening 64.

An elastomeric gasket 72 can be seated on the cover 70, or seated on the tubular wall 66 around the peripheral edge of the opening 64. Gasket 72 provides a secure seal around opening 64 to prevent or reduce entry of water or other liquid into the interior of the flashlight 10 when the cover 70 is closed. Gasket 72 can be formed with a tight compression fit between the cover 70 and wall 66 to provide both a water tight and a hermetic seal from the ambient.

To provide additional protection for the microphone 40 as well as for the audio and video recorders 52, 54 and other internal electronics, a porous or semi-porous membrane 80 can be mounted over the opening 64. Membrane 80 can be a fabric material which has little or virtually no muffling or sound absorbing effect on recording quality. A particularly effective membrane material is a fabric of the type sold under the brand GORTEX. An open pore foam or sponge material can also be used for membrane 80. Membrane 80 also blocks the entry of liquids and dirt into the interior of the flashlight 10 without; affecting microphone recording sensitivity and performance. Membrane 80 can also provide some protection for the microphone against loud noises.

Another embodiment is shown in FIG. 10 wherein the port or opening 64 is formed as a threaded bore 64 within wall 66. An axially-grooved screw 90 such as a quarter-turn "DRUZE" screw is threaded, into the threaded bore 64. An O-ring seal 72 is mounted on the flashlight wall 66 or on the inner or underside of the screw head 92. A deep axial groove 96 is formed diagonally along the shaft of the screw 90. When the screw 90 is tightened against the wall 66, the O-ring 72 is compressed to form a water-tight seal. When the screw 90 is turned one quarter turn open, the groove 90 provides open communication along the groove 96 between the surrounding environment, and the inside of the flashlight to provide high quality audio signals to microphone 40.

Another embodiment is shown in FIG. 11 where the switch cover 30 is movably mounted over an opening 64. The switch cover can slide axially from the position shown in solid lines to the position shown in dashed lines. When the switch cover 30 is moved forwardly along the wall 66 of the flashlight 10, opening 64 is uncovered allowing for improved audio input, improved audio sensitivity and sound, reception by the microphone 40 located adjacent the opening 64.

To simplify operation of the video recorder 54, the switch cover 30 can be provided with an actuator such as a finger 98 which turns on the video recorder 54 by engaging the button switch 32 when the switch cover 30 is moved to the forward or open position.

Another embodiment is shown in FIG. 12 where a rubber or elastomeric plug 100 is formed on a rubber or elastomeric strip 102 having one end 104 fixed to the flashlight wall 66 and it's opposite free end 106 serving as a pull strip to pull the plug 100 out of the opening 64. In this manner, opening 64 can be opened by removal of plug 100 from opening 64 and closed by insertion of plug 100 into opening 64. A similar opening and plug arrangement can be provided on another portion of the front body portion 12 to allow access and external power connection to a battery charging circuit for charging one or more rechargeable batteries housed in the rear body portion 14.

Yet another embodiment is disclosed in FIG. 13 wherein no port or opening 64 is formed in wall 66 in the proximity of the microphone 40. This embodiment is particularly well adapted for use in tactical police and military applications where loud noises such as gunfire and explosions can damage or destroy a sensitive microphone. By completely enclosing and sealing the microphone 40 within the walls 66 of flashlight 10, the shock waves produced by loud noises can be absorbed and attenuated by walls 66, yet accurately recorded, without damage to the microphone.

Similar protection against shock and loud noises can be provided to microphone 40 in any of the embodiments described above by covering some portion or all of microphone 40 in a sound and shock attenuating material. As seen in FIG. 13 and FIG. 14, microphone 40 can be enclosed or encased in a shock absorbing material 108, such as a plastic or rubber open cell foam material, a flocked material or a cotton batting material and the like.

In some cases, it is desirable to provide protection against inadvertent or unintended activation or deactivation of the audio and/or video recording functions. For example, in tense and dangerous situations, an operator may unintentionally momentarily squeeze the flashlight 10 so as to turn on or off the audio and/or video recording functions. Alternatively, the switches 32, 36 can be unintentionally activated by bumping or dropping. A solution to this problem is shown in FIG. 15 wherein a timer or time delay and switching circuit or "chip" 110 receives an on or off signal from a video only or audio/video switch 32 and/or the audio only switch 36.

After a predetermined short delay of at least one-half second up to one or two seconds, the time delay and switching circuit 110 activates or deactivates the respective audio and/or video function. In this manner, accidental bumping against the switches through brief depression of switch cover 30 will not affect the audio or video functions. However, depressing the switches 32 and/or 36 for one-half second (or more) will change the current operating mode of the audio and/or video functions from on to off and from off to on.

As further seen in FIG. 15, the switch cover 30 is provided with two or more different textured surfaces 118, 120. In one embodiment, the front portion of the switch cover 30 can be formed with a substantially smooth surface 118 and the rear portion of the switch cover can be formed with a substantially rough surface 120. This allows an operator to easily locate a desired audio, video or flashlight lighting function without looking at the flashlight or when in poor or dark lighting conditions.

If only two switches are provided under the switch cover, then only two different textures are required such as a smooth surface and a rougher surface with, for example, ribs 124 and grooves 126. A differently textured third surface 130 can be provided in those cases where the audio switch 36 is located beneath the switch cover 30. This could be a bumpy or checkered surface, for example.

There has been disclosed heretofore the best embodiment of the invention presently contemplated. However, it is to be understood that various changes and modifications may be made thereto without departing from the spirit of the invention.

What is claimed is:

1. A flashlight, comprising:
   a flashlight light source;
   a first switch disposed in a first position for turning said flashlight light source on and off;
   a video recorder;
   a second switch disposed in a second position adjacent said position for turning said video recorder on and off;
   an audio recorder;
   a third switch selectively preventing and enabling activation of said audio recorder;
   a single one-piece translucent switch cover overlying and covering said first and second switches, said single one-piece translucent switch cover being the only switch cover visible on said flashlight and obscuring visibility of said first and second switches; and
   a light, when said video recorder is turned on, is visible through said translucent switch cover providing notice to an operator that video images are being recorded and wherein said flashlight comprises a front body portion and a rear body portion removable from said front body portion, and wherein said third switch is made accessible by separating and removing said front and rear body portions from each other.

2. The flashlight of claim 1, wherein said light is turned off when said video recorder is turned off.

3. The flashlight of claim 1, wherein said translucent switch cover comprises a waterproof switch cover protecting said first and second switches from water damage.

4. The flashlight of claim 1, wherein said translucent switch cover comprises first and second different textured surface portions providing two different tactile sensations to an operator, wherein said first textured surface portion is aligned over said first switch and said second textured surface portion is aligned over said second switch.

5. The flashlight of claim 1, further comprising an audio recorder, and wherein said switch cover has a thin wall portion allowing sound to pass through said switch cover for recording by said audio recorder.

6. The flashlight of claim 4, wherein said first and second positions of said first and second switches are identified and selected by feeling said first and second different textured surface portions of said translucent switch cover.

7. The flashlight of claim 1, further comprising a delay circuit delaying recording by said video recorder.

8. A flashlight, comprising:
a hollow body portion preventing the entry of water therein and having an exterior wall and an opening formed in said exterior wall and selectively communicating with ambient externally of said hollow body portion;
a switch cover provided on said hollow body portion and constructed with a thin wall portion, said switch cover consisting of the only external switch cover on said flashlight;
an audio recorder integral with said flashlight and disposed inside said hollow body portion;
a switch selectively preventing and enabling activation of said audio recorder;
a microphone mounted within said flashlight sending audio signals to said audio recorder; and
a rubber or elastomeric plug removably insertable into the opening to prevent entry of water into the opening and to protect said microphone from harmful ambient conditions and removable from the opening to improve audio recording, and wherein said thin wall portion of said switch cover allows sufficient ambient sound to pass through it to produce audio recordings when said plug closes the opening and wherein said flashlight comprises a front body portion and a rear body portion removable from said front body portion, and wherein said switch is made accessible by separating removing said front and rear body parts from each other.

9. The flashlight of claim 8, further comprising a shock absorbing material provided within said hollow body portion and supporting at least a portion said microphone.

10. The flashlight of claim 8, further comprising a membrane having pores provided between the opening and said microphone to protect said microphone.

11. A flashlight comprising:
a hollow body portion comprising a closed water-tight enclosure;
a light source;
a first on-off switch provided at a first position within said hollow body portion and connected electrically to said light source;
an audio recorder comprising a microphone disposed in said water-tight enclosure;
a video recorder;
a second on-off switch provided at a second position within said hollow body portion adjacent to said first on-off switch and connected electrically said video recorder, said second on-off switch operating said audio and video recorders simultaneously;
a third switch selectively preventing and enabling activation of said audio recorder; and
a single one-piece resilient textured switch cover provided on an exterior portion of said hollow body portion and extending over said first and second on-off switches and resiliently depressible to operate said first and second switchs, said switch cover consisting of the only external switch cover on said flashlight, said switch cover having a first textured portion adjacent and movable over said first switch and a second textured portion having a texture different from said first textured portion and disposed adjacent and movable over said second switch, said first and second textured portions providing tactile feel to an operator to locate, identify and selectively operate said first and second switches for selectively turning on and off said tight source and said audio and video recorders, said switch cover constructed to obscure visibility of said first and second on-off switches, allow sound to pass through said switch cover into said water-tight enclosure and enable said microphone to record clear audio input within said water-tight enclosure and wherein said flashlight comprises a front body portion and rear body portion removable from said front body portion, and wherein said third switch is made accessible by separating and removing said front and rear body portions from each other.

12. The flashlight of claim 11, wherein said switch cover comprises a resilient elastomeric switch cover preventing water from entering said hollow body portion and further comprising a microphone disposed within said flashlight adjacent to said switch cover.

13. The flashlight of claim 11, further comprising a delay circuit delaying recording by said video recorder.

14. The flashlight of claim 11, wherein said switch cover comprises a thin wall portion to facilitate passage of sound through said switch cover and into said hollow body portion.

15. A flashlight, comprising:
a hollow body having a first portion removably connected to a second portion with a screw thread connection;
an audio recorder and a video recorder provided within said hollow body portion;
an audio video switch operable front an external portion of said hollow body for turning said audio recorder and said video recorder on and off; and
an audio switch provided within said hollow body portion enabling deactivation of said audio recorder without deactivation of said video recorder, wherein said audio switch is made accessible by separating said first and second portions of said hollow body by unscrewing said screw thread connection and removing said firs body portion from said second body portion.

16. The flashlight of claim 15, further comprising an internal wall within said hollow body and an audio and video download connector on said internal wall and wherein said audio switch is on said internal wall.

17. A multifunction flashlight comprising:
a flashlight body compromising a front body portion removably connected rear body portion with a threaded coupling;
a water-tight interior compartment provided in said from body portion;
one or more batteries housed in said rear body portion;
an audio recorder provided in said water-tight interior compartment;
a video recorder provided in said water-tight interior compartment;
a first switch provided in said water-tight interior compartment and connected to said audio and video recorders, said first switch capable of turning said audio and video recorders on and off;
a second switch provided in said water-tight compartment selectively turning said flashlight on and off;
a translucent switch cover provided on said front body portion and forming a water-tight seal over said first and second switches;

a light visible through said switch cover providing notice to an operator that video images are being recorded, wherein said light is turned off when said video recorder is turned off;

a third switch carried by said front body portion, said third switch enabling deactivation of said audio recorder without deactivation of said video recorder, said third switch accessible only by uncoupling and removing said front body portion from said rear body portion;

an electrical connector carried by said first body portion and connected so said audio and video recorders for downloading audio and video recordings, said electrical connector accessible only by uncoupling and removing said front body portion from said rear body portion;

a microphone provided in said water-tight interior compartment and connected to said audio recorder;

wherein said first, second and third switches, said audio recorder, said video recorder, said electrical connector and said microphone are not visible when said front body portion is coupled to said rear body portion.

18. The multifunction flashlight of claim 17, further comprising a flashlights lens provided on said front body portion and a video lens adjacent to and smaller than said flashlight lens provided on said front body portion, and a delay circuit provided in said water-tight compartment delaying recording by said video recorder.

\* \* \* \* \*